Patented Feb. 16, 1937

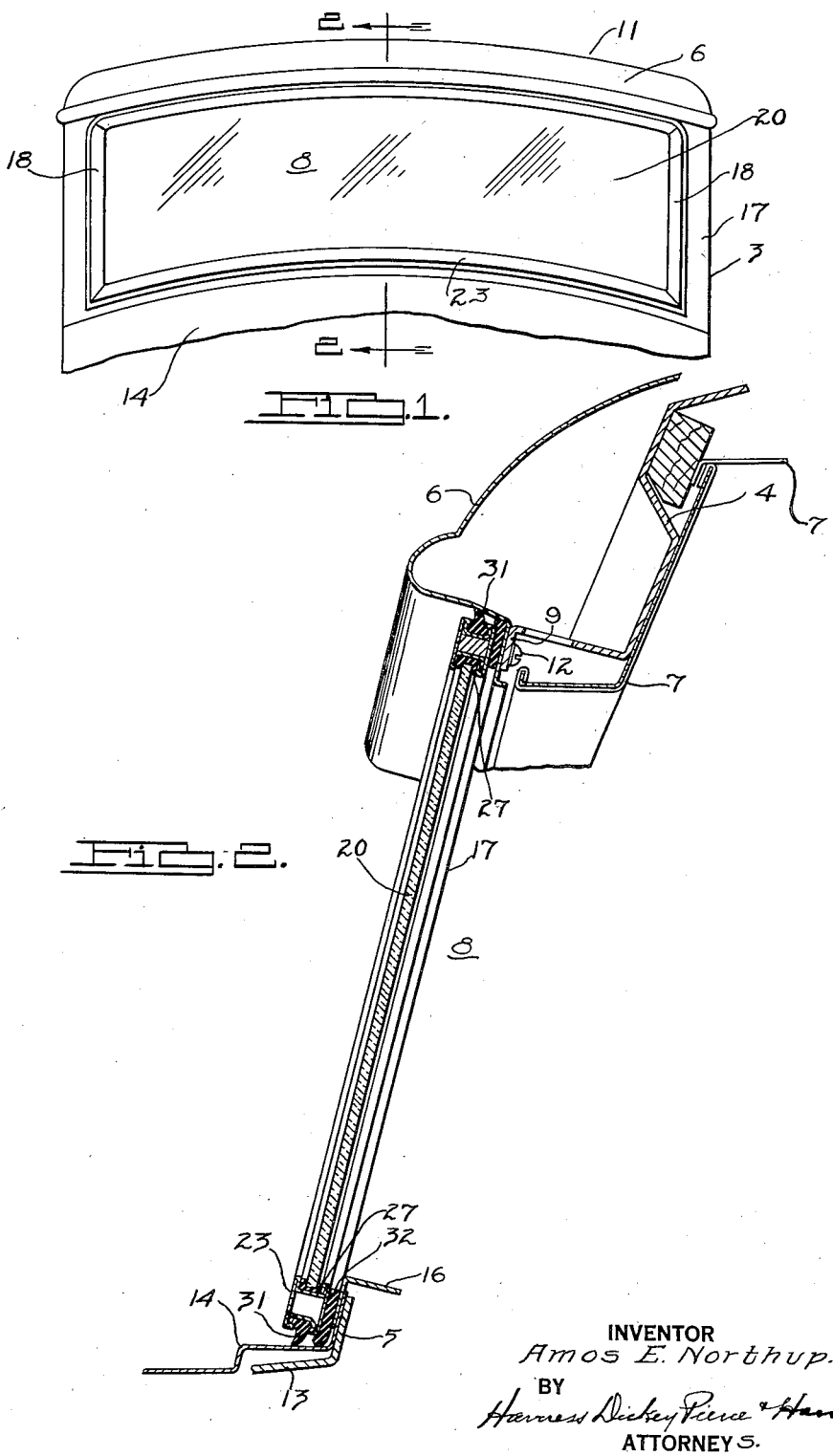

2,070,676

UNITED STATES PATENT OFFICE 2,070,676

WINDSHIELD MOUNTING

Amos E. Northup, Detroit, Mich., assignor to The Murray Corporation of America, a corporation of Delaware Application February 28, 1931, Serial No. 518,971

2 Claims. (Cl. 296—84)

This invention relates to a construction and mounting of windshields in automobile bodies and particularly in bodies of the closed type although the closures may be either collapsible or rigid.

The principal object of the invention is to so construct and mount the windshield in the vehicle body that a maximum range of vision will be provided for the operator of the vehicle.

Another object of the invention is to so construct and mount the windshield as to provide a maximum range of vision in the upward direction for the operator of the vehicle.

With these and other objects in view, my invention consists in the arrangement, combination and construction of the various parts of my structure as described and claimed in the specification and shown in the accompanying drawing in which:

Figure 1 is a front elevation of the upper front end of the vehicle body immediately forward of the windshield, and Fig. 2 is a sectional view taken on the line 2—2 of Figure 1.

Heretofore, it has been the practice in closed vehicle body construction to provide a roof with a substantially flat transverse contour and to extend the roof for a considerable distance forwardly over the top of the windshield. This extension is oftentimes, and in most cases, supplemented by an overhanging visor above the top of the windshield and attached to the forward end of the roof. It has also been the general practice to so mount such windshields that they may be opened for the purpose of ventilating the vehicle body, and in carrying out this practice the windshields have been mounted either to slide vertically upward in their side frame members to provide an opening between the bottom of the windshield and the top of the cowl, or to pivotally hang the shield along its upper edges to the body frame so that it may be swung either inwardly or outwardly of its frame to provide the opening for the admission of air. In the sliding type of windshield it has been necessary to provide sufficient head room in the body framing above the top of the windshield to permit it to be slid upwardly, and in the hinge type it has been necessary to provide a substantial header frame member above the top of the windshield to support the windshield hinges and it has also been necessary to make this header substantially straight or rectilinear to permit axial alignment of the hinges.

The trend of automobile body design is approaching a rounded transverse roof contour and the design tendency has also been to lower the bodies upon the chassis as much as practically possible and to reduce the head room within the body all that is practically possible, in order to lessen wind resistance, to prevent swaying and rocking, and to provide a low stream line appearance.

The effect of all these tendencies has been to move the roof of the body closer to the top of the operator's head and consequently to restrict his range of vision in the upward direction, and this restriction has been accentuated by the relatively deep header construction above the windshield which is required for the support and mounting and manipulation of the adjustable windshields, consequently the effect has been to so restrict the vision of the operator in an upward direction that it is impossible for him to keep sight of overhead obstructions which he may be driving under and traffic signal lamps which are frequently mounted upon relatively high standards at the street intersections or suspended above such intersections, and it is impossible for the driver or other occupant of the front seat to observe any objects which are elevated above the horizontal plane of the top of the windshield except at a considerable distance.

It is to the solution of these defects and undesirable qualities of body construction and windshield mounting that my invention is addressed.

In the drawing I have shown a front end of the upper portion of a vehicle body including the windshield and surrounding body structure. The body is indicated generally by the numeral 3 and it comprises front corner posts or pillars 17 which extend upwardly along this side of the body to the roof 5 thereof and which form the side frames for the windshield 8 which in this instance comprises a sheet of glass 20 mounted in a metal frame 18 which embraces its edges. The roof paneling 6 of the body is brought down and is secured to the tops of the pillars 17 and provides the framing for the top side of the windshield opening. The lower side of the windshield opening is framed by the rear top edge of the cowl paneling 14, the top surface of which is usually of a rounded contour as shown.

It will also be noted that in the construction illustrated the transverse contour of the roof is markedly rounded. Thus the framing members provide a windshield opening having parallel ends and having its top and bottom sides rounded or curved upwardly. As previously explained the present method of construction would require that the top side of the windshield opening be horizontal and rectilinear and that header framing of considerable depth be provided between the top of the windshield opening and the under side of the roof, thus narrowing the opening to a considerable extent and thereby limiting the range of vision from inside the body in the upward direction.

I have found that it is unnecessary to mount the windshield 8 so that it may be opened. Ventilation may be adequately taken care of by the conventional ventilating means which are provided in the cowl paneling 14, in its top and sides forwardly of the windshield, and also ventilating openings which are provided in many cases in the roof of the car. These ventilating means, together with the side windows of the car, which are always adjustable, are sufficient to provide adequate and comfortable ventilation. I have therefore eliminated most of the head room above the top edge of the windshield opening and have so constructed the framing members supporting the front edge of the roof between the corner pillars 17 as to permit the extension of the windshield opening to a point closely adjacent the inside ceiling of the body and have also shaped the upper edge of the windshield opening and the windshield glass to take full advantage of the upward curvature of the roof line. This has resulted in extending the windshield glass upwardly to a point considerably above the level of the eyes of the passengers or the operator, and by taking advantage of this upward curve of the roof I am enabled to increase the range of vision in the upward direction along the intermediate upper portion of the windshield opening. I have also found that the overhanging visors commonly used may as well be omitted. They do not shield the eyes of the operator from light projected through the windshield at or slightly above the level of the operator's eyes, and it is only these rays which interfere with the vision. The rays projected through the windshield from above the level of the operator's eyes are not reflected into his eyes but reflected downwardly and therefore do not interfere with his vision.

I have also, in the illustration shown, accentuated and increased to some extent the range of vision in the upward direction by inclining the windshield and corner posts slightly to the rear, thus bringing the obstruction to vision offered by the forward edge of the roof back closer to a point above the operator's head.

In the construction disclosed, a front header member 4 is provided which extends between and may be secured in any desired manner to the tops of the front corner pillars 17. This member 4 is shaped to extend rearwardly at an angle from the top of the windshield opening. The roof paneling 6 is also shaped to slope rearwardly from the top of the windshield opening and is provided adjacent its forward edge with a comparatively shallow rounded bead which is turned back and flanged downwardly and secured to a flange 9 on the lower forward edge of the header frame member 4, thus providing a shouldered margin against which the windshield 8 may be secured. The windshield 8 comprises a sheet of glass 20 having its edges embraced by a sheet metal framing 23 which is formed with a channel along its inner edge adapted to receive a channel weather strip 27 in which the edge of the glass 20 is received. The outside edge of the framing 23 is also provided with a channel in which is secured a weather strip 31 provided with a flexible tongue adapted to bear against the panel surfaces adjacent the window opening and exclude water and wind.

The cowl paneling 14 is provided with an upwardly extending flange at its rearward edge as shown in Fig. 2 which bears against and is secured to an upstanding flange 5 provided on the cowl bar 13 which extends between and joins the intermediate portions of the front corner pillars 17, and forms the lower edge of the windshield opening. The corner pillars 17 are provided with rabbets along their inner edges in the conventional manner which provide a support against which the rear side portions of the glass frame 23 may bear and be secured. A weather stripping 32 is laid along the margin of the windshield opening beneath the window glass framing 23. The framing 23 may be secured to the marginal flanges of the window opening by screws 12 extending thereinto from the inner sides of the marginal flanges of the window opening. Interior finish trim 7 may be secured to cover the framing members in any desired manner and the cowl instrument panel 16, a portion of which is shown in the lower part of Fig. 2, may be provided with a downwardly extending flange on its forward edge which is inserted and secured between the weather stripping 32 and upstanding rearward flange on the cowl panel 14.

Thus I have provided a windshield and mounting therefor which materially increases the vision of the occupants of the car in the upward direction, and have also improved the design and appearance of this portion of the car by conforming the upper boundary lines of the windshield to the transverse roof contour of the body, and by conforming the lower boundary lines of the windshield to the curved line of the cowl which harmonizes with the roof contour.

While I have described but a single embodiment of my invention, it will be apparent to anyone skilled in the art that many changes, omissions, additions and substitutions may be made therein without departing from the spirit and scope of my invention as set forth in the accompanying claims.

I claim:

1. In a vehicle body, a cowl panel, front pillars sloping rearwardly therefrom and defining a sloping windshield opening, a roof panel of sheet material bridging said pillars and curved upwardly transversely of the body, said roof panel bulging slightly forwardly of the pillars to provide a relatively shallow bead above the windshield opening and then sloping rearwardly of the pillars, said bead being curved upwardly transversely of the body, said roof panel, cowl panel and pillars carrying means for receiving a windshield in the opening formed thereby, and a windshield disposed in the opening and secured to said means.

2. In a vehicle body, a cowl panel curved upwardly transversely of the body, front pillars sloping rearwardly therefrom and defining a sloping windshield opening, a roof panel of sheet material bridging said pillars and curved upwardly transversely of the body, said roof panel bulging slightly forwardly of the pillars to provide a relatively shallow bead above the windshield opening and then sloping rearwardly of the pillars, said bead being curved upwardly transversely of the body, rabbets carried by the cowl panel, roof panel and pillars to border said opening and a windshield interfitted in said rabbets.

AMOS E. NORTHUP.